US012763586B2

(12) United States Patent
Kumamoto et al.

(10) Patent No.: US 12,763,586 B2
(45) Date of Patent: Oct. 13, 2026

(54) POWER SUPPLY DEVICE

(71) Applicant: FDK CORPORATION, Tokyo (JP)

(72) Inventors: Kiyotaka Kumamoto, Tokyo (JP); Yosuke Saito, Tokyo (JP); Yasuyuki Katsube, Tokyo (JP); Kazuhiro Hiwatashi, Tokyo (JP)

(73) Assignee: FDK CORPORATION, Tokyo (JP)

( * ) Notice: Subject to any disclaimer, the term of this patent is extended or adjusted under 35 U.S.C. 154(b) by 715 days.

(21) Appl. No.: 18/268,507

(22) PCT Filed: Sep. 27, 2021

(86) PCT No.: PCT/JP2021/035287

§ 371 (c)(1),
(2) Date: Jun. 20, 2023

(87) PCT Pub. No.: WO2022/137689

PCT Pub. Date: Jun. 30, 2022

(65) Prior Publication Data

US 2024/0055886 A1 Feb. 15, 2024

(30) Foreign Application Priority Data

Dec. 21, 2020 (JP) ................................ 2020-210903

(51) Int. Cl.
*H02J 7/00* (2026.01)
*H02J 7/24* (2006.01)
(Continued)

(52) U.S. Cl.
CPC ................ *H02J 7/34* (2013.01); *H02J 7/243* (2020.01); *H02J 7/54* (2026.01); *H02J 7/56* (2026.01);
(Continued)

(58) Field of Classification Search
CPC ...... H02J 7/34; H02J 7/243; H02J 7/54; H02J 7/56; H02J 7/585; H02J 7/61; H02J 7/63;
(Continued)

(56) References Cited

U.S. PATENT DOCUMENTS

2017/0063150 A1* 3/2017 Sakamoto ................ H02J 7/50

FOREIGN PATENT DOCUMENTS

JP 2006223050 A * 8/2006
JP 2014057393 A 3/2014
JP 2016010250 A 1/2016

OTHER PUBLICATIONS

International Search Report for International Application No. PCT/JP2021/035287; Date of Mailing, Nov. 22, 2021.

* cited by examiner

*Primary Examiner* — Zixuan Zhou
(74) *Attorney, Agent, or Firm* — CANTOR COLBURN LLP

(57) ABSTRACT

This power supply device includes a battery unit which includes: a first battery pack; a step-up/down circuit for boosting the voltage of an external power supply up to the charge voltage of the battery pack; a first charge circuit; a first discharge circuit for detecting a voltage drop of the external power supply and performing discharge from the battery pack to a load device; and a control circuit for controlling charging and discharging. The discharge circuit has a first discharge switch and a second discharge switch which are connected in series between the battery pack and a power supply line. The first discharge switch is switched on/off by receiving a switching signal from the control circuit, and the second discharge switch is directly switched on/off not via the control circuit on the basis of the voltage of the external power supply.

11 Claims, 3 Drawing Sheets

(51) Int. Cl.

| | |
|---|---|
| ***H02J 7/34*** | (2006.01) |
| ***H02J 7/50*** | (2026.01) |
| ***H02J 7/54*** | (2026.01) |
| ***H02J 7/56*** | (2026.01) |
| ***H02J 7/61*** | (2026.01) |
| ***H02J 7/63*** | (2026.01) |
| ***H02J 7/82*** | (2026.01) |
| ***H02J 7/96*** | (2026.01) |
| ***H02J 9/06*** | (2006.01) |

(52) U.S. Cl.
CPC ................ *H02J 7/585* (2026.01); *H02J 7/61* (2026.01); *H02J 7/63* (2026.01); *H02J 7/82* (2026.01); *H02J 7/855* (2026.01); *H02J 7/96* (2026.01); *H02J 9/06* (2013.01)

(58) Field of Classification Search
CPC ...... H02J 7/82; H02J 7/855; H02J 7/96; H02J 9/06
USPC .......................................................... 320/127
See application file for complete search history.

POWER SUPPLY DEVICE

CROSS REFERENCE TO RELATED APPLICATIONS

This is the U.S. national stage of application No. PCT/JP2021/035287, filed on Sep. 27, 2021. Priority under 35 U.S.C. § 119 (a) and 35 U.S.C. § 365 (b) is claimed from Japanese Application No. 2020-210903, filed Dec. 21, 2020, the disclosure of which is also incorporated herein by reference.

TECHNICAL FIELD

The present invention relates to a power supply device.

BACKGROUND ART

An uninterruptible power supply device, which is a power supply device that supplies power from a secondary battery charged in advance to a load device, supplies power without stopping the load device when the supply of power from an external power supply to the load device stops due to a power failure or the like. The secondary battery of the uninterruptible power supply device is charged with power supplied from the external power supply in the normal operation. As an example of the secondary battery used in the uninterruptible power supply device, an alkaline secondary battery such as a nickel-hydrogen secondary battery has been known.

The alkaline secondary battery needs to be charged at a voltage higher than the outputtable voltage due to its nature. In the uninterruptible power supply device, however, it is common that the battery is always connected to a power supply line for supplying power to the load device. Therefore, the terminal voltage of the battery is limited to the outputtable voltage, that is, the voltage of the load device even during charging, and thus the battery is not fully charged. As a result, the amount of dischargeable power is lower than the original battery capacity. In order to apply an appropriate charge voltage higher than the outputtable voltage during charging, it is necessary to provide a switch between the battery and the power supply line and disconnect the battery from the power supply line during charging.

Meanwhile, since the uninterruptible power supply device supplies power from the battery to the load device when a power failure occurs, it is essential to detect the state of the power failure and put the switch in a connected state to connect the battery to the power supply line. Further, when the alkaline secondary battery is fully charged with an appropriate charge voltage, the output voltage of the battery becomes higher than the upper limit of the allowable voltage of the load device immediately after the full charge, so that there is possibly a case where the battery temporarily cannot be connected to the load device.

As a related art of such a power supply device, for example, Patent Literature (hereinafter, referred to as PTL) 1 discloses a technique of switching a power supply to efficiently control power in a power control device in which an external power supply and a power storage device are connected to one load device.

CITATION LIST

Patent Literature

PTL 1

Japanese Patent Application Laid-Open No. 2014-057393

SUMMARY OF INVENTION

Technical Problem

In order to connect the alkaline secondary battery to the power supply line to discharge to the load device in case of power failure, it is essential, not only to detect the power failure state, but also to monitor whether the output voltage of the battery is within a voltage range connectable to the load device. Accordingly, it takes time to transmit a connection signal for a switch after various determinations are made and to change the connection state of the switch; therefore, the load device possibly stops before the battery supplies power to the load device.

The present invention has been made in view of such problems, and an object of the present invention is to provide a power supply device capable of obtaining dischargeable power amount by charging an alkaline secondary battery to a fully charged state, and capable of detecting the occurrence of a power failure and of instantaneously starting discharging from the alkaline secondary battery to a load device.

Solution to Problem

An aspect of a power supply device of the present disclosure includes: a power supply line for supplying power from an external power supply to a load device; and a battery unit connected to the power supply line and connected in parallel with the external power supply, in which the battery unit include: a battery pack whose charge voltage is higher than a voltage of the external power supply; step-up/down circuit for stepping up the voltage of the external power supply to the charge voltage of the battery pack; a charge circuit for charging the battery pack at the charge voltage; a discharge circuit for detecting a voltage drop of the external power supply and discharging from the battery pack to the load device through the power supply line; and a control circuit that controls the charge circuit and the discharge circuit, and the discharge circuit includes a first discharge switch and a second discharge switch connected in series between the battery pack and the power supply line, the first discharge switch is switched to on/off by receiving a switching signal from the control circuit, and the second discharge switch is directly switched to on/off based on the voltage of the external power supply without via the control circuit.

Advantageous Effects of Invention

According to the power supply device of the present disclosure, it is possible to provide a power supply device capable of obtaining dischargeable power amount by charging an alkaline secondary battery to a fully charged state, and capable of detecting the occurrence of a power failure and of instantaneously starting discharging from the alkaline secondary battery to a load device.

DESCRIPTION OF EMBODIMENTS

Hereinafter, an embodiment of the present invention will be described with reference to the drawings.

Figure 1:
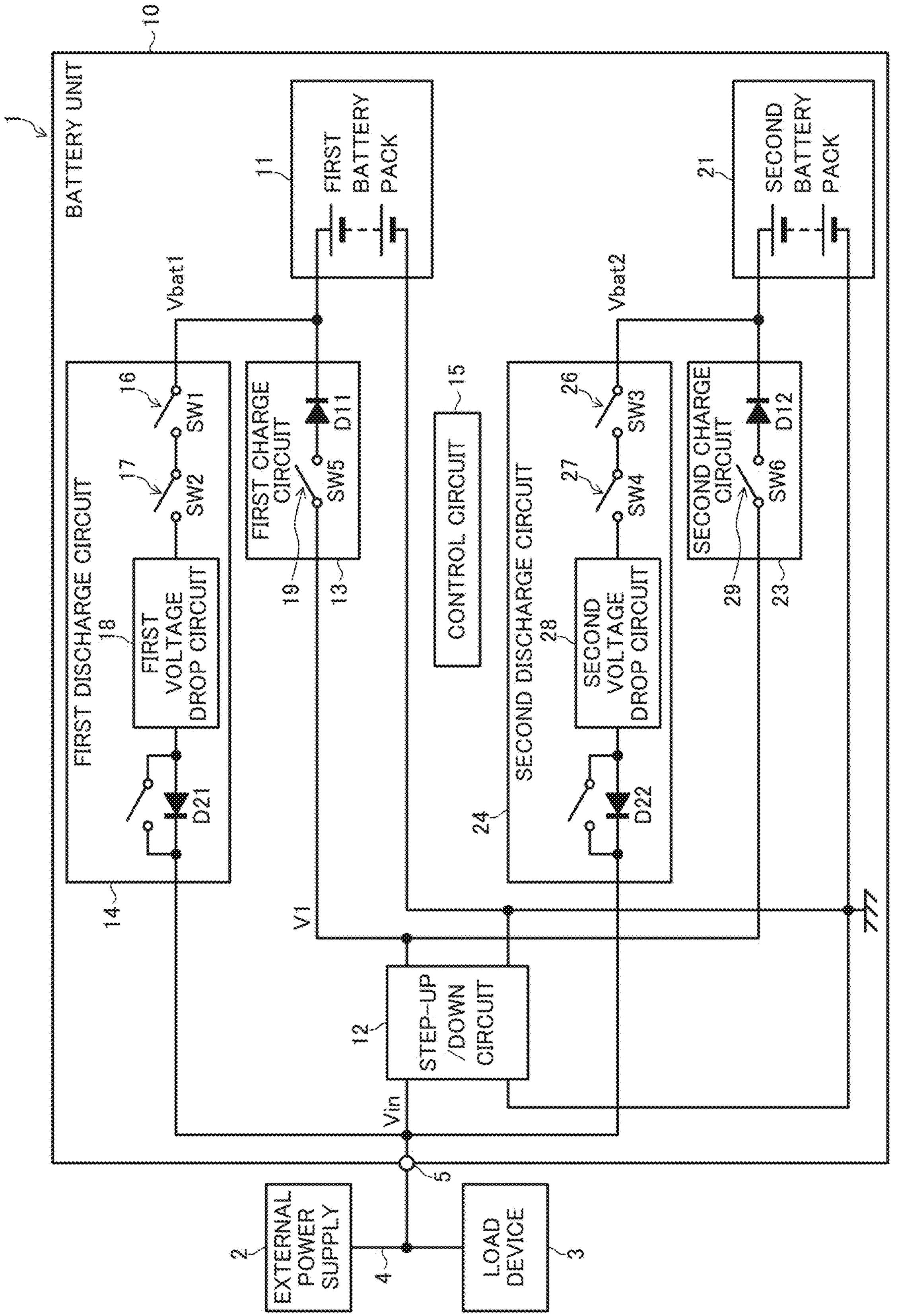
FIG. 1 is a block diagram of a power supply device according to an embodiment.

FIG. 1 is a block diagram according to an embodiment. This power supply device 1 includes power supply line 4 for supplying power from external power supply 2 to load device 3. Battery unit 10 is connected to power supply line 4, and battery unit 10 is connected in parallel with external power supply 2. This configuration makes it possible to supply power from external power supply 2 to load device 3 in a normal state, and to supply power from battery unit 10 to load device 3 when the supply from external power supply 2 stops. Input/output terminal 5 may be provided in battery unit 10, and power supply between power supply line 4 and battery unit 10 may be performed through input/output terminal 5.

Battery unit 10 includes first battery pack 11, step-up/down circuit 12, first charge circuit 13, first discharge circuit 14, and control circuit 15. External power supply 2 can charge first battery pack 11 through power supply line 4. Further, first battery pack 11 can supply power to load device 3 by discharging to power supply line 4.

First charge circuit 13 and first discharge circuit 14 are connected in parallel with each other between power supply line 4 and first battery pack 11. Step-up/down circuit 12 is further connected in series between power supply line 4 and first charge circuit 13. Control circuit 15 constantly monitors the internal state of battery unit 10 based on the voltage and input/output current of power supply line 4, respective voltages, currents, and temperatures of first battery pack 11 during charging and discharging, and another necessary information, and controls operations of step-up/down circuit 12, first charge circuit 13, and first discharge circuit 14.

Further, battery unit 10 includes second battery pack 21, second charge circuit 23, and second discharge circuit 24. External power supply 2 can charge second battery pack 21 through power supply line 4. Second battery pack 21 can supply power to load device 3 by discharging to power supply line 4. Second battery pack 21 and first battery pack 11 are connected in parallel with each other with respect to power supply line 4, and the discharge to power supply line 4 can be performed from either one of first battery pack 11 and second battery pack 21 or from both of them simultaneously.

Second charge circuit 23 and second discharge circuit 24 are connected in parallel between power supply line 4 and second battery pack 21. Step-up/down circuit 12 is further connected in series between power supply line 4 and second charge circuit 23. Control circuit 15 constantly monitors the internal state of battery unit 10 based on the voltage and input/output current of power supply line 4, respective voltages, currents, and temperatures of second battery pack 21 during charging and discharging, and another necessary information, and controls operations of second charge circuit 23 and second discharge circuit 24.

The supply of power to power supply line 4 is performed by switching between external power supply 2 and either one or both of first battery pack 11 and second battery pack 21. Therefore, the supply voltage from external power supply 2 and the output voltages from first battery pack 11 and second battery pack 21 are set to be substantially the same as one another.

Meanwhile, for the charge voltage of first battery pack 11 and second battery pack 21 each formed of a secondary battery, a voltage higher than the output voltage during discharging is required. Therefore, when first battery pack 11 and second battery pack 21 are charged, the voltage supplied from external power supply 2 to power supply line 4 is raised to the charge voltage of first battery pack 11 and second battery pack 21 by step-up/down circuit 12. First charge circuit 13 charges first battery pack 11 with the raised voltage. Further, second charge circuit 23 charges second battery pack 21 with the raised voltage.

First discharge circuit 14 can detect the stop of power supply from external power supply 2, that is, the voltage drop of power supply line 4, and can connect first battery pack 11 to power supply line 4 to supply power to load device 3.

Further, second discharge circuit 24 can detect the stop of power supply from external power supply 2, that is, the voltage drop of power supply line 4, and can connect second battery pack 21 to power supply line 4 to supply power to load device 3.

Step-up/down circuit 12 is formed of, for example, a DC/DC converter, and raises voltage Vin supplied from external power supply 2 to charge voltage V1 for charging first battery pack 11. First charge circuit 13 includes first charge switch 19 and diode element D11 that limits the current direction. First charge switch 19 is turned on during charging, and charge voltage V1 supplied from step-up/down circuit 12 is applied to first battery pack 11. First charge switch 19 is turned off when the charging is not performed, and the path from power supply line 4 to first battery pack 11 through first charge circuit 13 is put in an open state.

Similarly, second charge circuit 23 includes second charge switch 29 and diode element D12 that limits the current direction. Second charge switch 29 is turned on during charging, and charge voltage V1 supplied from step-up/down circuit 12 is applied to second battery pack 21. Second charge switch 29 is turned off when the charging is not performed, and the path from power supply line 4 to second battery pack 21 through second charge circuit 23 is put in an open state.

First discharge circuit 14 includes first discharge switch 16 and second discharge switch 17, which are connected in series between first battery pack 11 and power supply line 4 together with diode element D21 that limits the current direction. Therefore, when both first discharge switch 16 and second discharge switch 17 are in on states, first battery pack 11 is connected to power supply line 4, and power is supplied from first battery pack 11 to load device 3.

The on/off state of first discharge switch 16 is switched by receiving a switching signal from control circuit 15. The on/off state of second discharge switch 17 is directly switched based on the voltage of power supply line 4 without via control circuit 15. Second discharge switch 17 is turned on when the voltage of power supply line 4 decreases to a predetermined voltage or less, that is, when second discharge switch 17 detects the power failure state of external power supply 2.

Second discharge circuit 24 includes third discharge switch 26 and fourth discharge switch 27, which are connected in series between first battery pack 11 and power supply line 4 together with diode element D22 that limits the current direction. Therefore, when both third discharge switch 26 and fourth discharge switch 27 are in on states, second battery pack 21 is connected to power supply line 4, and power is supplied from second battery pack 21 to load device 3.

The on/off state of third discharge switch 26 is switched by receiving a switching signal from control circuit 15. The on/off state of fourth discharge switch 27 is directly switched based on the voltage of external power supply 2 without via control circuit 15. Fourth discharge switch 27 is turned on when the voltage of power supply line 4 decreases to a predetermined voltage or less, that is, when fourth discharge switch 27 detects the power failure state of external power supply 2.

A switch is connected in parallel with diode element D21, and when first battery pack 11 discharges, the switch is tuned on to short-circuit between terminals of diode element D21, so that a decrease in the supply voltage to power supply line 4 in a forward direction due to a voltage drop of diode element D21 can be avoided. Similarly, a switch is connected in parallel with diode element D22, and when second battery pack 21 discharges, the switch is tuned on to short-circuit between terminals of diode element D22, so that a decrease in the supply voltage to power supply line 4 in a forward direction due to a voltage drop of diode element D22 can be avoided. Control circuit 15 controls on/off switching of these switches.

Control circuit 15 monitors first output voltage Vbat1 of first battery pack 11, and when first output voltage Vbat1 of first battery pack 11 is in the dischargeable range, control circuit 15 holds first discharge switch 16 in the on state to put battery unit 10 in the dischargeable state. Further, when first output voltage Vbat1 is out of the dischargeable range, control circuit 15 holds first discharge switch 16 in the off state to put battery unit 10 in the discharge prohibited state.

Similarly, control circuit 15 monitors second output voltage Vbat2 of second battery pack 21, and when second output voltage Vbat2 of second battery pack 21 is in the dischargeable range, control circuit 15 holds third discharge switch 26 in the on state to put battery unit 10 in the dischargeable state. Further, when second output voltage Vbat2 is out of the dischargeable range, control circuit 15 holds third discharge switch 26 in the off state to put battery unit 10 in the discharge prohibited state.

The dischargeable range herein is an operable voltage range of load device 3. The lower limit of the voltage is determined to a final discharge voltage of first battery pack 11 and second battery pack 21. The final discharge voltage is generally determined to a lower limit of a discharge voltage at which discharge is safely performed without damaging the internal structure of the battery in the secondary battery.

For example, a nickel-hydrogen battery may be used as the secondary battery configuring first battery pack 11 and second battery pack 21. The nickel-hydrogen battery has a wide outputtable voltage range; therefore, when the final discharge voltage of the battery is set as a lower limit of the operable voltage range of load device 3, first output voltage Vbat1 and second output voltage Vbat2 immediately after full charge are possibly higher than the upper limit of the operation allowable voltage range of load device 3. In this case, in order to avoid damage to load device 3 due to overvoltage application, the upper limit of the dischargeable range of battery unit 10 is determined to the upper limit of the allowable voltage of load device 3.

As described above, when first output voltage Vbat1 immediately after full charge is higher than the upper limit of the operation allowable voltage of load device 3, even after first battery pack 11 is fully charged, first discharge switch 16 remains in the off state until first output voltage Vbat1 of first battery pack 11 decreases to the operation allowable voltage range of load device 3, and thus the discharge prohibited state of battery unit 10 can be maintained.

First voltage drop circuit 18 can be provided between second discharge switch 17 of first discharge circuit 14 and power supply line 4. In this case, the voltage output from battery unit 10 to power supply line 4 is decreased by first voltage drop circuit 18 by a predetermined voltage from actual first output voltage Vbat1 of first battery pack 11. Adding this voltage drop circuit makes it possible to raise the upper limit of the dischargeable range of battery unit 10 by a predetermined voltage decreased by first voltage drop circuit 18. Thus, it is possible to shorten a period in which battery unit 10 is in a discharge prohibited state after first battery pack 11 is fully charged.

This first voltage drop circuit 18 may be configured by connecting a diode element from first battery pack 11 toward power supply line 4 in a forward direction. For example, when a PN junction type diode is used, the voltage drops in accordance with the built-in potential of the diode. This voltage drop is generally 0.6 V to 0.7 V. In this configuration, a value to which the voltage drops can be adjusted in accordance with the number of the diodes connected in series. Further, a switch is connected in parallel with these diode elements of first voltage drop circuit 18, and when the function of the voltage drop is not used, the switch is turned on to short-circuit between the terminals of the diode elements.

Similarly, when second output voltage Vbat2 immediately after full charge is higher than the upper limit of the operation allowable voltage of load device 3, even after second battery pack 21 is fully charged, third discharge switch 26 remains in the off state until second output voltage Vbat2 of second battery pack 21 decreases to the operation allowable voltage range of load device 3, and thus the discharge prohibited state of battery unit 10 can be maintained.

In addition, second voltage drop circuit 28 can be provided between fourth discharge switch 27 of second discharge circuit 24 and power supply line 4. In this case, the voltage output from battery unit 10 to power supply line 4 is decreased by second voltage drop circuit 28 by a predetermined voltage from actual second output voltage Vbat2 of second battery pack 21. Adding this circuit makes it possible to raise the upper limit of the dischargeable range of battery unit 10 by a predetermined voltage decreased by second voltage drop circuit 28. Thus, it is possible to shorten a period in which battery unit 10 is in a discharge prohibited state after second battery pack 21 is fully charged.

This second voltage drop circuit 28 can be configured by connecting a diode element from second battery pack 21 toward power supply line 4 in a forward direction. For example, when a PN junction type diode is used, the voltage drops in accordance with the built-in potential of the diode. This voltage drop is generally 0.6 V to 0.7 V. In this configuration, a value to which the voltage drops can be adjusted in accordance with the number of the diodes connected in series. Further, a switch is connected in parallel with these diode elements of second voltage drop circuit 28, and when the function of the voltage drop is not used, the switch is turned on to short-circuit between the terminals of the diode elements.

Furthermore, first voltage drop circuit 18 and second voltage drop circuit 28 may be formed of a field effect transistor. In addition, first voltage drop circuit 18 and second voltage drop circuit 28 may be configured by a well-known voltage divider circuit formed of a resistive element.

In battery unit 10 disclosed in the embodiment, when first battery pack 11 is charged, first discharge switch 16 of first discharge circuit 14 is held in the off state, and the discharge path from first battery pack 11 to power supply line 4 is in an open state. Further, when second battery pack 21 is charged, third discharge switch 26 of second discharge circuit 24 is held in the off state, and the discharge path from second battery pack 21 to power supply line 4 is in an open state.

Therefore, first battery pack 11 and second battery pack 21 can be charged to a fully charged state without limiting the charge voltage to the set voltage of power supply line 4. Accordingly, it is possible to obtain the discharge power amount corresponding to a battery capacity of each first battery pack 11 and second battery pack 21.

Further, when first output voltage Vbat1 of first battery pack 11 is within the dischargeable range, first discharge switch 16 is held in the on state, so that battery unit 10 is held in the dischargeable state. When the voltage of power supply line 4 drops in this state, driving circuit 20 instantaneously responds to the voltage drop and switches second discharge switch 17 to the on state, and power is immediately discharged from first battery pack 11 to power supply line 4 and supplied to load device 3.

Similarly, when second output voltage Vbat2 of second battery pack 21 is within the dischargeable range, third discharge switch 26 is held in the on state, so that battery unit 10 is held in the dischargeable state. When the voltage of power supply line 4 drops in this state, driving circuit 20 instantaneously responds to the voltage drop and switches fourth discharge switch 27 to the on state, and power is immediately discharged from second battery pack 21 to power supply line 4 and power is supplied to load device 3.

As described above, according to the present embodiment, it is possible to provide power supply device 1 capable of obtaining dischargeable power amount by charging first battery pack 11 and second battery pack 21 to a fully charged state, and capable of detecting the occurrence of a power failure to instantaneously start discharging from first battery pack 11 and second battery pack 21 to load device 3.

Figure 2:
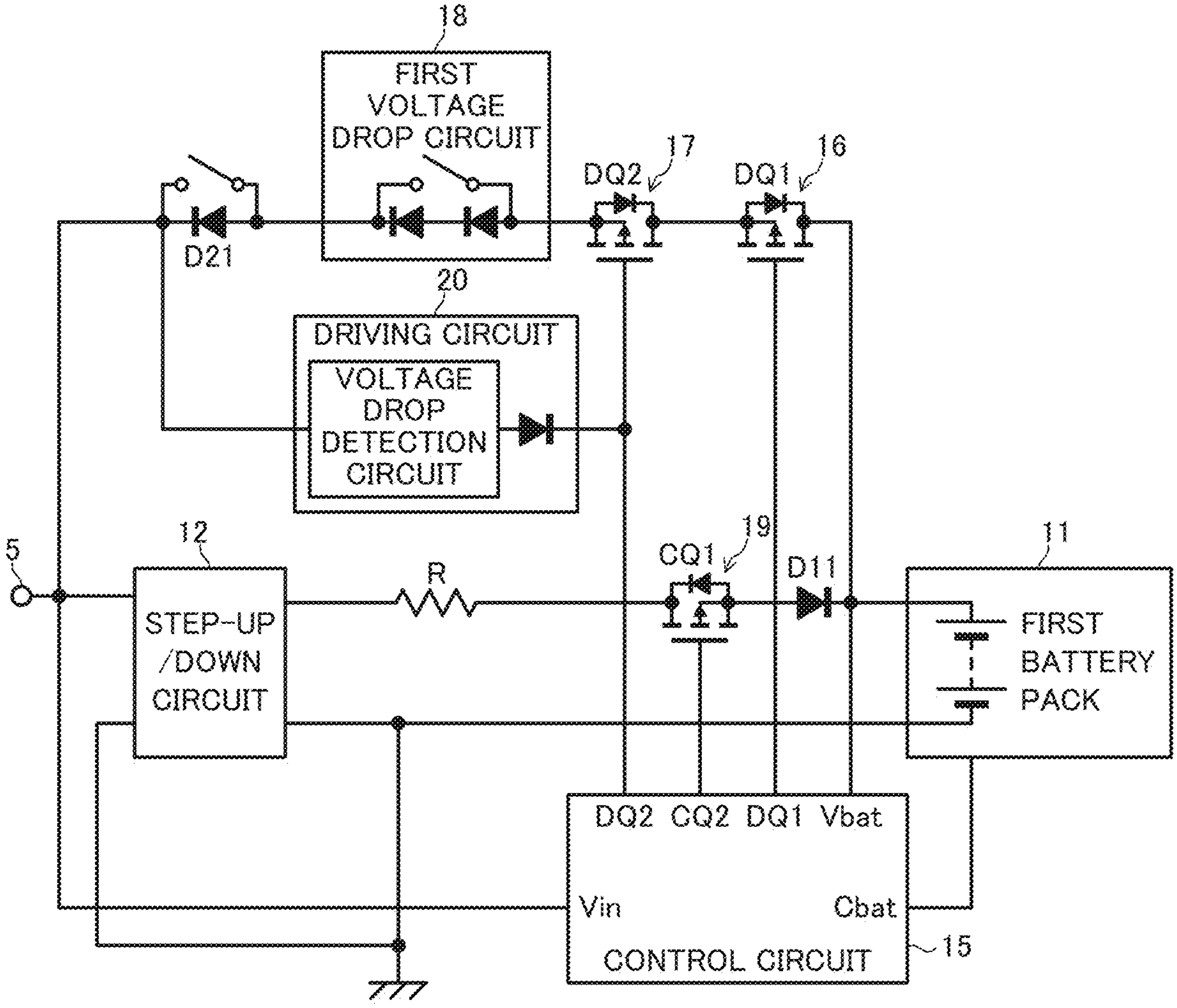
FIG. 2 is a circuit diagram illustrating a portion of the power supply device according to the embodiment.

FIG. 2 illustrates a detailed exemplary circuit diagram of first charge circuit 13 and first discharge circuit 14. First charge switch 19 of first charge circuit 13 is formed of insulated gate field effect transistor CQ1. This first charge switch 19 of first charge circuit 13 is put in an on state when first battery pack 11 is charged, and is kept in an off state in other conditions.

When first battery pack 11 is charged, first, step-up/down circuit 12 is activated to output a charge voltage required for charging. Then, a charge permission signal is supplied from a CQ2 terminal of control circuit 15 to a gate electrode of first charge switch 19, and first charge switch 19 is switched to the on state. Thus, the charge voltage output from step-up/down circuit 12 is applied to first battery pack 11, and the charging starts. First charge circuit 13 may include resistance element R connected in series. This configuration of the circuit constant of first charge circuit 13 including resistance element R can determine a charge current to perform constant current charge.

When control circuit 15 detects the completion of charging of first battery pack 11, charge prohibition signal is supplied from a CQ2 terminal of control circuit 15 to the gate electrode of first charge switch 19, and first charge switch 19 is switched to the off state, which stops application of the charge voltage to first battery pack 11. The completion of the charging may be determined, for example, by monitoring the terminal voltage of first battery pack 11.

Each of first discharge switch 16 and second discharge switch 17 of first discharge circuit 14 may be formed of insulated gate field effect transistors DQ1, DQ2, respectively. The gate electrode of first discharge switch 16 is driven by a switching signal supplied from a DQ1 terminal of control circuit 15.

Control circuit 15 constantly monitors various parameters such as an output voltage and temperature of first battery pack 11. When first output voltage Vbat1 of first battery pack 11 is in the dischargeable range, that is, in the voltage range in which load device 3 can operate, a signal for turning on first discharge switch 16 is supplied from the DQ1 terminal of control circuit 15, and first discharge 16 is held in the on state. Further, when first output voltage Vbat1 is out of the dischargeable range, that is, out of the voltage range in which load device 3 can operate, a signal for turning off first discharge switch 16 is supplied from the DQ1 terminal of control circuit 15 to hold first discharge switch 16 in the off state.

Driving circuit 20 that operates in response to a voltage supplied from external power supply 2 to power supply line 4 is connected to the gate electrode of second discharge switch 17. While power is supplied from external power supply 2 at a predetermined voltage, second discharge switch 17 is held in the off state. This driving circuit 20 instantaneously responds to the detection of the voltage drop of external power supply 2, that is, the voltage drop of power supply line 4 and switches the gate electrode of second discharge switch 17 to the on state.

As described above, first charge circuit 13 and first discharge circuit 14 can be configured by the circuit diagram illustrated in FIG. 2. Further, although not illustrated in FIG. 2, second charge circuit 23 and second discharge circuit 24 can also perform the same circuit operation as first charge circuit 13 and first discharge circuit 14, respectively, with the same circuit configuration.

Figure 3:
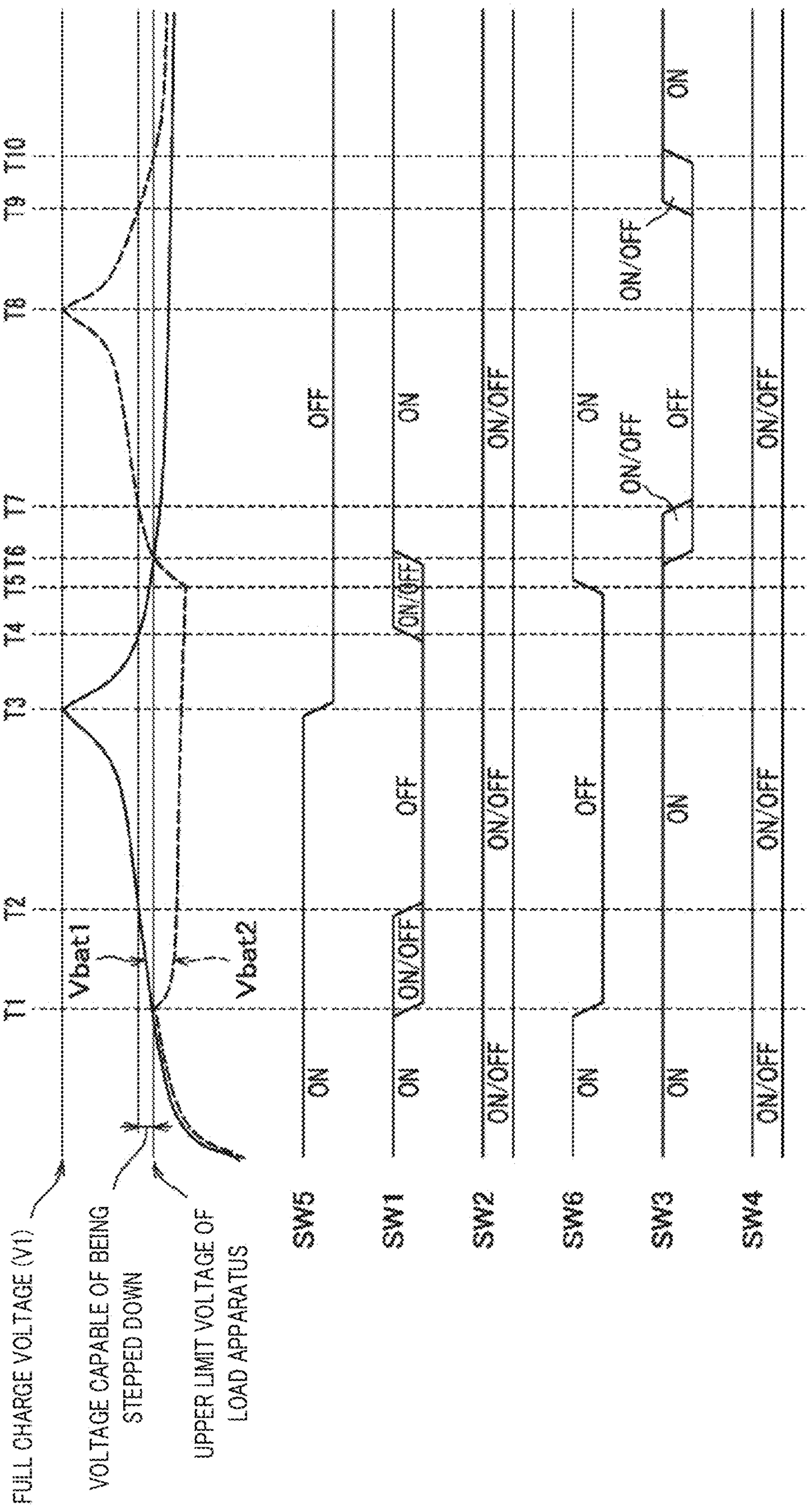
FIG. 3 is a timing chart when the power supply device according to the embodiment is operated as an uninterruptible power supply.

FIG. 3 is a timing chart of the charging and discharging procedure when power supply device 1 according to the embodiment is operated as an uninterruptible power supply. In the drawing, first discharge switch 16 is described as SW 1, second discharge switch 17 as SW 2, third discharge switch 26 as SW 3, fourth discharge switch 27 as SW 4, first charge switch 19 as SW 5, and second charge switch 29 as SW 6.

(Section: At the Time of Powering on to T1)

In power supply device 1 when stopped, first battery pack 11 and second battery pack 21 is not connected to the power supply, and the charge amount decreases due to self-discharging. Therefore, when power is turned on, first charge switch 19: SW 5 of first battery pack 11 is turned on to charge first battery pack 11, and at the same time, second charge switch 29: SW 6 of second battery pack 21 is turned on to charge second battery back 21.

While first output voltage Vbat1 of first battery pack 11 is lower than the upper limit of the operable voltage of load device 3, first battery pack 11 is in a dischargeable state. Similarly, while second output voltage Vbat2 of second battery pack 21 is lower than the upper limit of the operable voltage of load device 3, second battery pack 21 is also in a dischargeable state. The dischargeable state means a state in which, when the supply of power from external power supply 2 stops, power can be immediately supplied from the battery unit to load device 3 via power supply line 4. Therefore, in the dischargeable state, first discharge switch 16: SW 1 and third discharge switch 26: SW 3 are each held in the on state.

At this time, second discharge switch 17: SW 2 and fourth discharge switch 27: SW 4 are both in a waiting state for power failure detection. The notation of ON/OFF in FIG. 3 indicates that the switch is put in the off state while external power supply 2 operates, and the switch is changed to the on state when external power supply 2 fails, that is, when it is detected that the voltage of power supply line 4 decreases to less than a predetermined voltage. When power supply device 1 is in normal operation, second discharge switch 17: SW 2 and fourth discharge switch 27: SW 4 are both always in the waiting state for power failure detection to perform the uninterruptible operation, but when there is a particular reason, a control signal can be supplied from control circuit 15, and first discharge switch 16: SW 1 can be turned off to keep the discharge from first battery pack 11 in the prohibited state. Further, third discharge switch 26: SW3 can be turned off to keep the discharge from second battery pack 21 in the prohibited state.

The charging continues, and, for example, when second output voltage Vbat 2 of second battery pack 21 reaches the upper limit of the operable voltage of load device 3 (at the time of T1), several switches are switched.

(Section: T1 to T2)

At the time of T1, second charge switch 29: SW 6 is switched to the off state, and the charging of second battery pack 21 stops. On the other hand, the charging of first battery pack 11 continues. Then, because first output voltage Vbat1 exceeds the upper limit of the operable voltage of load device 3, first discharge switch 16: SW 1 is switched to the off state to change first battery pack 11 to the discharge prohibited state.

Further, although second battery pack 21 is not fully charged at this point, second charge switch 29: SW 6 is switched to the off state and the charging temporarily stops. Third discharge switch 26: SW 3 of second discharge circuit 24 is in the on state, and fourth discharge switch 27: SW 4 remains in the waiting state for power failure detection; therefore, the dischargeable state is maintained. At this time, when a power failure occurs in external power supply 2, fourth discharge switch 27: SW 4 in second discharge circuit 24 of second battery pack 21 detects the voltage drop of power supply line 4 and immediately switches to the on state, and power is supplied from second battery pack 21 to power supply line 4 via second discharge circuit 24, which continues the operation of load device 3.

As described above, the uninterruptible operation of power supply device 1 can be realized by always holding second battery pack 21 in the dischargeable state while first battery pack 11 is in the discharge prohibited state.

Further, first voltage drop circuit 18 can be used in the operation of this section. First voltage drop circuit 18, can, for example, supply power to power supply line 4 by decreasing the voltage of first output voltage Vbat1 of first battery pack 11. Therefore, even in a case where first output voltage Vbat1 exceeds the upper limit of the operable voltage of load device 3, first discharge switch 16: SW 1 is put in the on state when the excess amount is within the range to which first voltage drop circuit 18 can drop the voltage, and the dischargeable state of first battery pack 11 can be maintained.

(Section: T2 to T3)

At the time of T2, because first output voltage Vbat1 of first battery pack 11 exceeds the upper limit of the operable voltage of load device 3 even though the voltage is dropped by first voltage drop circuit 18, it is necessary to put first discharge switch 16: SW1 in the off state to put first battery pack 11 in the discharge prohibited state. On the other hand, third discharge switch 26: SW 3 of second battery pack 21 continues to be in the on state even in this section, and second battery pack 21 continues to be in the dischargeable state.

When first battery pack 11 is fully charged at the time of T3, first charge switch 19: SW 5 is switched to the off state, and the charging stops. Meanwhile, each switch of second battery pack 21 continues to be in a dischargeable state without being switched.

(Section: T3 to T4)

At the time of T3, because the charging of first battery pack 11 stops but first output voltage Vbat1 of first battery pack 11 exceeds the upper limit of the operable voltage of load device 3, first discharge switch 16: SW 1 of first discharge circuit 14 remains in the off state, and the discharge prohibited state continues. Since the discharge prohibited state of first battery pack 11 continues, the off state of third discharge switch 26: SW 3 of second battery pack 21 on the other side is also maintained, and the dischargeable state continues.

At this time, because the charging of first battery pack 11 stops, first output voltage Vbat1 gradually decreases due to self-discharging. A load circuit may be provided inside first battery pack 11 for discharging, as necessary. Discharging through this load circuit can facilitate a decrease in first output voltage Vbat1 of first battery pack 11, and first output voltage Vbat1 can be decreased to an operable level of load device 3 early.

(Section: T4 to T5 to T6)

In the section of T4 to T6, similarly to the section of T1 to T2, the voltage of first output voltage Vbat1 of first battery pack 11 can be decreased to within the operable range of load device 3 by first voltage drop circuit 18. Therefore, first discharge switch 16: SW 1 of first discharge circuit 14 may be switched to the on state to switch first battery pack 11 to the dischargeable state.

Further, first battery pack 11 is already in a dischargeable state, and thus second battery pack 21 can start charging by switching second charge switch 29: SW 6 to the on state at any timing. In FIG. 3, second charge switch 29: SW 6 of second charge circuit 23 is switched to the on state at the time of T5, and the charging of second battery pack 21 starts. However, while second output voltage Vbat2 of second battery pack 21 is within the operable range of load device 3 even when the charging starts, third discharge switch 26: SW 3 of second discharge circuit 24 may remain in the on state, and second battery pack 21 may continue to be in the dischargeable state.

(Section: T6 to T7)

Because second output voltage Vbat2 of second battery pack 21 exceeds the upper limit of the operable voltage of load device 3 from the time of T6, third discharge switch 26: SW 3 of second discharge circuit 24 is switched to the off state when second voltage drop circuit 28 is not used, and second battery pack 21 is put in the discharge prohibited state. When second voltage drop circuit 28 is used, the timing of switching third discharge switch 26: SW 3 to the off state can be postponed to the time of T7. After T7, second output voltage Vbat2 of second battery pack 21 exceeds the upper limit of the operable voltage of load device 3 even though the voltage is dropped by second voltage drop circuit 28; therefore, third discharge switch 26: SW 3 of second discharge circuit 24 is turned off to put second battery pack 21 in the discharge prohibited state.

The operation of first battery pack 11 in this section is the same as the operation of second battery pack 21 in the section of T2 to T3, and the operation of second battery pack 21 in this section is the same as the operation of first battery pack 11 in the section of T2 to T3.

(Section: T7 to T8 to T9 to T10)

The operation of first battery pack 11 in this section is the same as that of second battery pack 21 in the section of T2 to T3 to T4 to T6, and the operation of second battery pack 21 in this section is the same as that of first battery pack 11 in the section of T2 to T3 to T4 to T6.

As described above, power supply device 1 capable of performing a complete uninterruptible operation can be provided by connecting the two battery packs, that is, first battery pack 11 and second battery pack 21, in parallel with each other to complementarily operate, and by putting either one of them always in a dischargeable state.

<Exemplary Application>

In the present disclosure, a nickel-hydrogen battery may be used as a secondary battery, for example. Typical nickel-hydrogen batteries need at least approximately 1.6 V as a charge voltage, and the power voltage immediately after being fully charged is approximately 1.5 V to 1.55 V. Then, the voltage rapidly drops immediately after the discharging stats from the fully charged state, and the voltage decreases to approximately 1.2 V, which is a nominal voltage, by discharging a small portion of the battery capacity. Thereafter, the discharging continues, keeping the voltage at around 1.2 V, which is the nominal voltage, and the voltage rapidly drops as the battery capacity decreases. Then, in order to avoid damage to the battery due to overdischarging, 1.0 V is generally determined to a final discharge voltage, and the discharge needs to be stopped at this voltage.

Further, a 48 V lead-acid battery device can be used as battery unit 10 of power supply device 1 of the present disclosure, for example. The nominal voltage is 48 V when 40 nickel-hydrogen batteries are connected in series, and the lead-acid battery and the nickel-hydrogen batteries can be compatible with each other regarding the output voltage during discharging.

However, the charge voltage of the 48 V lead-acid battery device is, for example, 54.4 V. Therefore, the upper limit of the supply voltage of power supply line 4 is approximately 54.4 V. On the other hand, 40 nickel-hydrogen batteries connected in series needs approximately 64 V as the charge voltage. However, step-up/down circuit 12 of the present disclosure can raise the charge voltage of 54.4 V suitable for the lead-acid battery to 64 V, so that 40 nickel-hydrogen batteries connected in series can be charged to the fully charged state.

Further, the output voltage of 40 nickel-hydrogen batteries connected in series immediately after full charge is approximately 60 V to 62 V. The voltage of power supply line 4 is normally 54.4 V, and when the upper limit thereof is set to, for example, approximately 56 V to 57 V, the output voltage immediately after the full charge of 40 nickel-hydrogen batteries connected in series exceeds the upper limit of power supply line 4, that is, the upper limit of the allowable voltage of load device 3. Therefore, power cannot be supplied from the battery to power supply line 4 in this state.

However, first discharge circuit 14 of the present disclosure includes first discharge switch 16: SW 1 that prohibits the supply of power from first battery pack 11 to power supply line 4 when the voltage is out of the operable voltage range of load device 3. Therefore, it is controllable so as not to supply power from first battery pack 11 to power supply line 4 while the output voltage of the 40 nickel-hydrogen batteries connected in series exceeds the upper limit of power supply line 4.

As described above, in power supply device 1 of the present disclosure, a battery unit including a lead-acid battery device and a battery unit including a nickel-hydrogen secondary battery can be compatible with each other. The lead-acid battery device is not limited to the 48 V system, and a battery unit including a nickel-hydrogen secondary battery having compatibility with a 24 V system or a 12 V system can be configured.

Further, even when a lithium ion battery is employed as the secondary battery, it is obviously configurable by reviewing the circuit constant of each circuit block in battery unit 10 of the present disclosure to match the lithium ion battery.

REFERENCE SIGNS LIST

1 Power supply device
2 External power supply
3 Load device
4 Power supply line
5 Input/output terminal
10 Battery unit
11 First battery pack
12 Step-up/down circuit
13 First charge circuit
14 First discharge circuit
15 Control circuit
16 First discharge switch
17 Second discharge switch
18 First voltage drop circuit
19 First charge switch
20 Driving circuit
21 Second battery pack
23 Second charge circuit
24 Second discharge circuit
26 Third discharge switch
27 Fourth discharge switch
28 Second voltage drop circuit
29 Second charge switch
V1 Charge voltage
Vin Voltage
Vbat1 First output voltage
Vbat2 Second output voltage

The invention claimed is:

1. A power supply device, comprising:

a power supply line for supplying power from an external power supply to a load device; and a battery unit connected to the power supply line and connected in parallel with the external power supply, wherein the battery unit includes:

- a battery pack including a first battery pack and a second battery pack of which each charge voltage is higher than a voltage of the external power supply and which are connected to the power supply line in parallel with each other;
- a step-up/down circuit for stepping up the voltage of the external power supply to the charge voltage;
- a first charge circuit for charging the first battery pack at the charge voltage;
- a second charge circuit for charging the second battery pack at the charge voltage;
- a first discharge circuit for detecting a voltage drop of the external power supply and discharging from the first battery pack to the load device through the power supply line; and a second discharge circuit for detecting a voltage drop of the external power supply and discharging from the second battery pack to the load device through the power supply line; and a control circuit that controls the first charge circuit, the first discharge circuit, the second charge circuit and the second discharge circuit, wherein the first discharge circuit includes a first discharge switch and a second discharge switch connected in series between the first battery pack and the power supply line, the first discharge switch is switched to on/off by receiving a switching signal from the control circuit, and the second discharge switch is directly switched to on/off based on the voltage of the external power supply without via the control circuit, the first discharge circuit includes a third discharge switch and a fourth discharge switch connected in series between the second battery pack and the power supply line, the third discharge switch is switched to on/off by receiving a switching signal from the control circuit, and the fourth discharge switch is directly switched to on/off based on the voltage of the external power supply without via the control circuit, the first discharge circuit and the second discharge circuit are connected to the power supply line in parallel with each other and include a first voltage drop circuit and a second voltage drop circuit, respectively, for dropping the output voltage of the first battery pack and the second battery pack by a predetermined voltage to output the voltage to the power supply line, the first voltage drop circuit is connected between the power supply line and the second discharge switch, and the second voltage drop circuit is connected between the power supply line and the fourth discharge switch.

2. The power supply device according to claim 1, wherein the second discharge switch and the fourth discharge switch are turned on when the voltage of the external power supply decreases to a predetermined voltage or less.

3. The power supply device according to claim 1, wherein the control circuit monitors an output voltage of the first battery pack or the second battery pack, puts the battery unit in a dischargeable state by turning on the first discharge switch or the third discharge switch when the output voltage of the first battery pack or the second battery pack is within a dischargeable range, and puts the battery unit in a discharge prohibited state by turning off the first discharge switch or the third discharge switch when the output voltage is outside the dischargeable range.

4. The power supply device according to claim 3, wherein a lower limit of the dischargeable range of the output voltage of the first battery pack and the second battery pack is determined to a final discharge voltage of the first battery pack and the second battery pack, and an upper limit of the dischargeable range is determined to an upper limit of an allowable voltage of the load device.

5. The power supply device according to claim 4, wherein an output voltage of the first battery pack and the second battery pack in a fully charged state is higher than the upper limit of the allowable voltage of the load device.

6. The power supply device according to claim 3, wherein the control circuit charges the first battery pack or the second battery pack to a fully charged state, and maintains the discharge prohibited state of the battery unit by putting the first discharge switch or the third discharge switch in an off state until the output voltage of the first battery pack or the second battery pack decreases to within the dischargeable range after the first battery pack or the second battery pack reaches the fully charged state.

7. The power supply device according to claim 3, wherein each of the first voltage drop circuit and the second voltage drop circuit is formed of a diode or a transistor.

8. The power supply device according to claim 3, wherein each of the first voltage drop circuit and the second voltage drop circuit is formed of a resistive element.

9. The power supply device according to claim 3, wherein an upper limit of the dischargeable range rises by the predetermined voltage dropped by the first voltage drop circuit or the second voltage drop circuit.

10. The power supply device according to claim 1, wherein each of the first discharge switch the second discharge switch, the third discharge switch and the fourth discharge switch is formed of an insulated gate field effect transistor, a gate electrode of the first discharge switch and the third discharge switch is driven by the switching signal from the control circuit, and a gate electrode of the second discharge switch and the fourth discharge switch is driven by a driving circuit that instantaneously responds to the voltage drop of the external power supply.

11. The power supply device according to claim 1, wherein at least one of the first battery pack and/or the second battery pack is in a dischargeable state.

* * * * *